Figure 2:
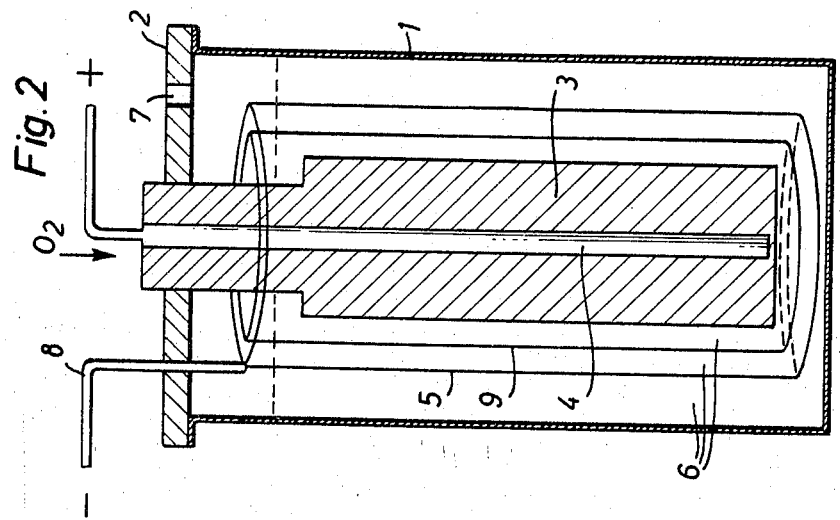

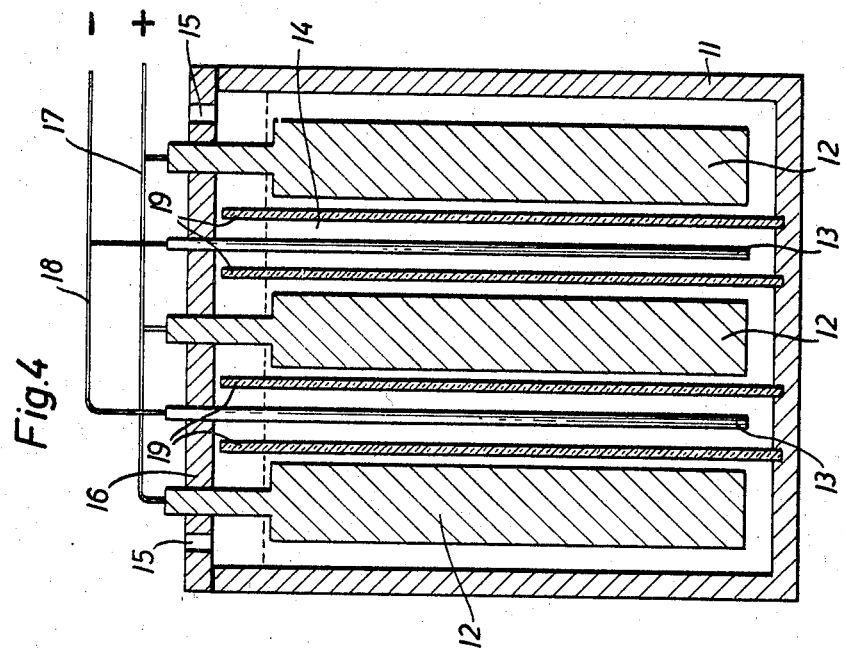
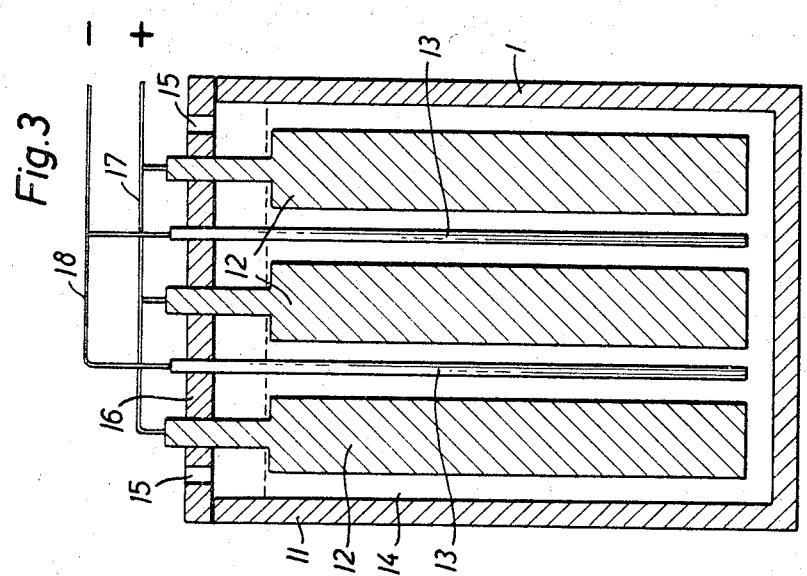

3,442,711
HYDRAZINE FUEL CELL
Wolf Vielstich, Bonn, Germany, assignor to Federal Republic of Germany, represented by the Minister of Defense, Bonn, Germany
Filed June 22, 1964, Ser. No. 378,484
Int. Cl. H01m 27/00
U.S. Cl. 136—86                                                15 Claims The present invention relates to fuel cells. and more particularly to arrangements for the electro-chemical reaction of a fuel dissolved in an electrolyte by means of oxygen or air, which is designated as a fuel element, with the development of useful electrical current thereby.

Methods have been proposed for the conversion of the chemical energy of flammable liquids into electrical energy in electrochemical manner. It has been proposed that this be accomplished by the reaction in a single cell fuel element with the fuel dissolved in an electrolyte, and being provided with an oxygen electrode. In carrying this out, the non-ionized fuel is thoroughly and completely mixed with the electrolyte, and the fuel electrode, which is immersed into the electrolyte-fuel mixture, contains a Raney metal of group VIII of the periodic system of elements as a catalytic active ingredient. The oxygen electrode, which is also immersed into this mixture, is electrochemically non-reactive with the fuel. As oxygen electrode, a shaped piece of carbon is used which should have a predetermined pore diameter and which should be subjected to a complicated pretreatment.

Ethyl alcohol or methyl alcohol has been used as water-soluble, liquid fuel. As non-water-soluble fuel diesel oil has been used, which must be mixed by means of a dissolving intermediary.

It is a primary object of the present invention to provide a fuel cell which at room temperature gives a high continuous load and short time load.

It is a further object of the present invention to provide a fuel element in which the polarization of the fuel electrode is reduced to a minimum, and as a result the need for electrolyte during the operation is avoided.

It is yet another object of the present invention to provide a fuel cell which can effectively use hydrazine as the fuel to give a high yield of electrical energy.

It is yet another object of the present invention to provide a fuel cell using hydrazine as the fuel which can be constructed without any diaphragm between the electrodes.

It is yet another object of the present invention to provide a fuel cell using hydrazine as the fuel in which only non-noble metals are used (as the fuel electrode), and in which the oxygen electrode is completely non-metallic.

Other objects and advantages of the present invention will be apparent from a further reading of the specification and of the appended claims.

With the above and other objects in view, the present invention mainly comprises as a fuel cell, in combination, a housing, an alkaline elctrolyte located in the housing and having hydrazine distributed therethrough, a fuel electrode formed of at least one metal of group VIII of the periodic system and being free of metals of groups II and III of the periodic system in contact with the electrolyte, and a metal-free carbon electrode spaced from the fuel electrode and in contact with the electrolyte.

Although the fuel cells of the present invention can be constructed so as to have a diaphragm between the fuel electrode and the carbon electrode (oxygen electrode), as is necessary in conventional fuel cells, it is an advantage of the present invention that the fuel cell can be made without any diaphragm between the fuel electrode and the oxygen electrode, while nevertheless achieving entirely satisfactory operation. This possibility of providing a fuel cell without a diaphragm between the fuel electrode and the oxygen electrode reduces the cost of manufacture of such fuel cell, and in addition greatly simplifies the manufacture thereof.

Contrary to known fuel cells, the present invention fuel cell utilizes hydrazine as the fuel (distributed in an alkaline electrolyte), and uses as the fuel electrode a non-noble metal of group VIII of the periodic system, most preferably iron, cobalt or nickel, which is entirely free of metals of groups II and III of the periodic system. In other words, the fuel electrode in the fuel cell of the present invention is not made of a Raney metal, and this is of course a further advantage of the present invention in that it reduces the cost of manufacture and provides for the possibility of constructing fuel cells entirely of readily available materials.

In accordance with the present invention, the oxygen electrode is formed of carbon which, contrary to ordinary oxygen electrodes, does not contain any metal additives. This further reduces the cost of the fuel cell, and also permits longer operation thereof.

The fuel electrode may be in the form of a porous body, a foil or sheet, or a net-like body. Thus, for example, it may be a rolled, porous sheet of nickel, iron or cobalt (or a mixture of two or three of these metals), or it may be a pressed and sintered body of particles of nickel and/or iron and/or cobalt.

It has been known for a fairly long time that hydrazine dissolved in an aqueous alkaline electrolyte can be electrochemically oxidized to give off a high current density and low polarization. However, considerable difficulties arise in the practical utilization thereof.

Thus, as a result of the high degree of reactivity of the hydrazine, the fuel is vigorously decomposed not only at the fuel electrode, but also at the oxygen electrode, to the extent that the same is immersed in the fuel-electrolyte mixture, and consequently a high degree of additional loss of fuel cannot be avoided. In addition, the potential of the oxygen electrode is displaced to entirely unsatisfactory values.

It has further been found in accordance with the present invention that the generally known and many times utilized fuel electrodes made of Raney metals as well as noble metals, or noble metals on carbon, cannot be used for the purposes of the present invention, because the same vigorously decompose hydrazine even at room temperature, without the possibility of taking off an anodic current. This also results in the loss of a large amount of the fuel which becomes gaseous and escapes from the electrolyte and is not utilized.

Quite surprisingly, it has been found that the non-noble metals of group VIII of the periodic system produce a negligibly low gas development without anodic load, so that ordinary porous metal, for example, is sufficient to electrochemically transform hydrazine in alkaline electrolytes at room temperature and current densities of several hundred ma./cm.$^2$.

The situation is similar with the oxygen electrode. It has been found that the hydrogen decomposition on the oxygen electrodes commonly used for alkaline fuel elements, namely those made of silver or similar metals or containing silver or similar metals, is dependent on this electrode. It has quite surprisingly been found that silver, which for practically all other fuels is inactive, catalyzes the oxidation of hydrazine.

Thus, in accordance with the present invention, by avoiding the presence of silver, and in fact all other oxygen-active metals at the oxygen-diffusion electrode, and utilizing only carbon as the catalyst material, the oxygen electrode can be immersed in the hydrazine-electrolyte mixture without the need for any separating diaphragm. It has been found that carbon-oxygen electrodes in hydrazine-containing alkaline electrolytes exhibit a 50 mv. greater characteristic line as compared to the pure alkaline electrolyte of the same concentration.

Thus, in accordance with the conditions of the present invention it is possible to very simply build a hydrazine-oxygen fuel element which is self-decomposing and operates with practically no loss. In accordance with the invention the non-noble metal fuel electrode and the carbon-oxygen electrode are both immersed in the fuel-electrolyte mixture. For insulation purposes it is possible, if desired, to separate the two electrodes by a wide-mesh plastic screen or web.

As the oxygen-(air-) carbon diffusion electrode it is equally possible to use a highly hydrophobic electrode operating without excess pressure or an electrode to which oxygen (air) is added with slight excess pressure of for example 0.1–1 superatmospheres.

It is an important condition of the present invention that the oxygen electrode be made of metal-free carbon which, however, can contain the usual hydrocarbons present in the making of the carbon electrodes. It is further preferable in accordance with the present invention to dip the carbon electrode in a paraffin bath prior to use of the carbon electrode in order to make the same hydrophobic.

As indicated above the fuel electrode can be made of rolled porous sheets of nickel, iron or cobalt, or it can be made in the form of shaped bodies of pressed and sintered powdered nickel, iron or cobalt. In the latter connection the porous metal body can preferably be applied to mechanically stable carriers such as metal nets, sheets or sieves, which metal carriers can simultaneously be used for the conduction of current.

All types of aqueous alkaline solutions can be used as alkaline electrolyte in accordance with the invention. In general, alkali metal hydroxides, alkaline earth metal hydroxides and ammonium hydroxide can be used in aqueous solution as the alkaline electrolyte. The most suitable electrolytes are sodium hydroxide and potassium hydroxide in aqueous solution because of their ready availability, and excellent conductivity. The alkaline electrolyte is most preferably present in the aqueous solution in a concentration of about 3–3 mols per liter.

In contrast to other alkaline fuel elements with liquid fuels, it is an important advantage of the present invention that in the electrochemical oxidation of the fuel hydrazine no electrolyte is used up. This is an extremely important economic advantage.

The hydrazine fuel is either continuously or discontinuously introduced into the fuel element, or it is possible to circulate the whole fuel-electrolyte mixture in and out of the fuel element, and to enrich the mixture with fresh hydrazine when the circulating mixture is outside the cell. The concentration of the hydrazine in the element can vary within extremely wide ranges, for example ranges of between 0.1 and 40% by weight of the content of the liquid in the cell gives excellent results. Most preferable range for the concentration of the hydrazine is between about 1 and 10% by weight.

Although it is possible in accordance with the present invention to provide fuel cells without any diaphragm between the electrodes, when fuel cells are made with diaphragms according to this invention, any material normally used for diaphragms which is stable in alkaline solution can be used, these materials generally being in the form of plastic webs, such as webs of polyethylene, Teflon, polyvinylchloride, as well as diaphragms of porous carbon and also ion exchange membranes.

Figure 1:
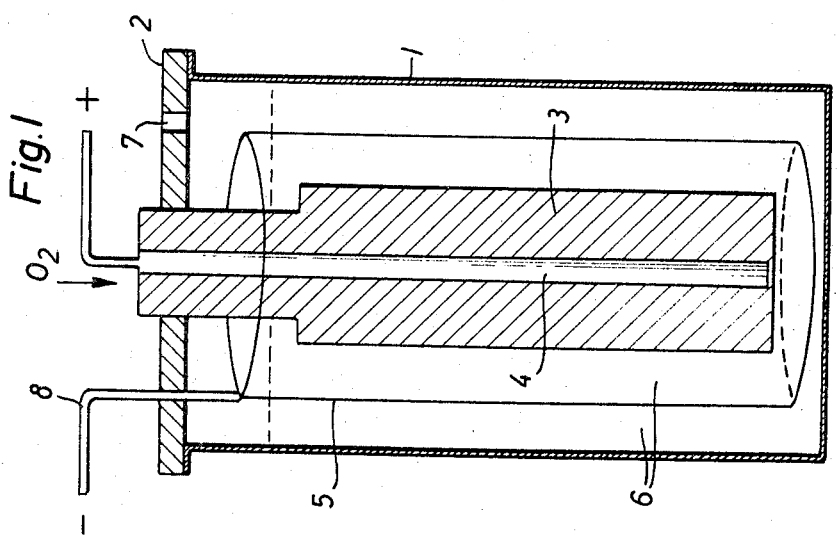

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 schematically illustrates a single fuel cell according to one embodiment of the invention in which there is no diaphragm between the electrodes;

FIG. 2 schematically shows a fuel cell according to another embodiment of the present invention in which there is a diaphragm between the electrodes;

FIG. 3 schematically illustrates a battery comprising a plurality of fuel cells, according to the embodiment of the invention in which no diaphragm is used between the electrodes; and FIG. 4 schematically illustrates a battery comprising a plurality of fuel cells according to the invention with diaphragms provided between the electrodes.

Referring now more specifically to the drawings, and particularly to FIG. 1, a cylindrical carbon-air diffusion electrode 3 is arranged in a vessel 1, which for example can be made of glass or any other suitable material. The upper portion of the carbon electrode 3 is adhesively joined to a plastic lid 2 which may, for example, be made of polyethylene. The adhesive connection can be made by any suitable adhesive, for example the commercial product known as UHU-plus which is a 2-component adhesive made of epoxy resin or ethoxyline resin. The center of the porous carbon electrode 3 is provided with a graphite rod 4 for the taking off of the current. A fuel electrode 5 made of nickel sheet is arranged concentrically around the carbon electrode 3. The nickel fuel electrode 5 is connected to a conductor 8 which passes through the lid 2, for the taking off of the current. The vessel is filled to the dotted line with the electrolyte-fuel mixture 6. The lid 2 is provided with an opening 7 for the equalization of pressure.

All of the elements of the arrangement of FIG. 2 are identical to the elements in FIG. 1, the difference being that the fuel cell of FIG. 2 is provided with a wide mesh polyethylene web 9 which acts as a diaphragm between the carbon electrode 3 and the nickel fuel electrode 5.

Referring now to the battery of FIG. 3, a polyethylene container 1 of rectangular cross section, which for example is 50 cm. long, 30 cm. high and 10 cm. wide serves as the battery vessel. Three plate-like carbon diffusion electrodes 12 and two nickel plates 13 which act as the fuel electrodes are arranged through a lid 16 which is provided with two openings 15 for the equalization of pressure. The carbon diffusion electrodes 12 are all connected to a conductor 17, and the nickel plates 13 are both connected to a conductor 18, for the withdrawal of current from the battery. The battery is filled to the dotted line with the electrolyte-fuel mixture 14.

The arrangement of FIG. 4 is identical to the arrangement of FIG. 3, with like numbers indicating like parts, with the exception that a diaphragm 19 is provided between each of the carbon electrodes 12 and the fuel electrodes 13. Also, in the arrangement of FIG. 4, in order to accommodate the diaphragm, the vessel 11 is 15 cm. wide.

The diaphragms 19 are arranged on both sides of the nickel electrodes 13, and the diaphragm is here made of porous carbon of about 3 mm. thickness. The diaphragms are adhesively connected to the side walls of the vessel with suitable clearance from the bottom. In this arrangement, the pure-electrolyte mixture is only filled in the spaces between the diaphragms. In the chamber for the oxygen electrode there is introduced 6 N KOH.

The following example describes the operation of the fuel cell of FIG. 2 in which the housing is a 1 liter glass vessel, and in which the diaphragm is a wide mesh polyethylene screen. The fuel electrode is made of rolled porous nickel (70% porosity) and has a surface of 150 cm.$^2$. The electrolyte is 6 normal KOH and contains 3% hydrazine as fuel. The EMF of the element amounts to 1.05 volt. Up to 10 amps can be taken from the element for a short time at room temperature. At 2 amps steady load, the terminal voltage amounts to 0.8 volt. The polarization of the fuel electrode is negligible. It amounts to only 120 mv. at 100 ma./cm.$^2$. The current produced is therefore increased by the conductivity of the oxygen electrode. If oxygen under slightly increased pressure is conducted to the carbon electrode instead of the air at normal pressure, the current density can be increased thereby to about four times the value.

The action of the batteries of FIGS. 3 and 4 is analogous to the above described action of the single fuel cell of FIG. 2, which is substantially the same as the action of the fuel cell of FIG. 1.

Atmospheric oxygen diffuses into the three porous carbon electrodes to the three phase limits. Each of the carbon electrodes is in continuous operation charged with 5–6 amps. The working voltage amounts to 0.7–0.8 volts.

Therefore 15–20 amps at 12–15 watts of output can be obtained from the battery.

Among the various ways of making electrodes according to the present invention are the following:

Carbonyl-nickel powder (grain size 50–100μ) are first pressed with a pressure of 5 tons/cm.$^2$ and subsequently sintered at 400–600° C. for 30 minutes in an argon atmosphere.

According to another method of production, nickel-carbonyl powder is mixed with aluminum powder in a weight ratio of 3:1, pressed under a pressure of 5 tons/cm.$^2$ at 200° C., and subsequently sintered in an argon atmosphere of 300–500° C. The aluminum is then dissolved out in warm sodium hydroxide solution.

It is also suitable to use rolled plate sold by the International Nickel Co., prepared according to Belgian Patent No. 613,222.

In order to obtain a roughened surface on the electrode band, nickel carbonyl is compressed between rollers and sintered. This band is then again sintered between two sheets of nickel powder having a low apparent density. This results in an adhering porous nickel layer on each side. The porous electrode is then formed by cutting. The sintered layers of nickel powder preferably comprise about 70–85% of the thickness, and the underlaying band about 20–30%.

All types of commercially pressed porous carbon in the form of sheets or cylinders can be used as carbon electrodes. It is advantageous to immerse the carbon electrode body in a paraffin bath for about 3–10 minutes so as to make the surface of the same hydrophobic.

It will be understood that each of the elements described above, or two or more together, may also find a useful application in other types of fuel cell differing from the types described above.

While the invention has been illustrated and described as embodied in fuel cell using hydrazine as the fuel, it is not intended to be limited to the details shown, since various modifications and structure changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fuel cell comprising, in combination, a housing; an alkaline electrolyte located in said housing and having hydrazine distributed therethrough; a fuel electrode consisting essentially of a coherent continuous body formed of at least one metal of group VIII of the periodic system and being free of metals of groups II and III of the periodic system in contact with said electrolyte; and a metal-free carbon electrode spaced from said fuel electrode and in contact with said electrolyte.

2. A fuel cell comprising, in combination, a diaphragm-free housing; an alkaline electrolyte located in said housing and having hydrazine distributed therethrough; a fuel electrode consisting essentially of a coherent continuous body formed of at least one metal of group VIII of the periodic system and being free of metals of groups II and III of the periodic system in contact with said electrolyte; and a metal-free carbon electrode spaced from said fuel electrode and in contact with said electrolyte.

3. A fuel cell comprising, in combination, a housing; an alkaline electrolyte located in said housing and having hydrazine distributed therethrough; a fuel electrode consisting essentially of a coherent, continuous body formed of at least one metal of group VIII of the periodic system and being free of metals of groups II and III of the periodic system in contact with said electrolyte; and a metal-free carbon electrode spaced from said fuel electrode and in contact with said electrolyte, said fuel electrode and said carbon electrode defining therebetween a space which is occupied substantially only by said alkaline electrolyte.

4. A fuel cell comprising, in combination, a housing; an alkaline electrolyte located in said housing and having hydrazine distributed therethrough; a fuel electrode consisting essentially of a coherent, continuous body formed of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte.

5. A fuel cell comprising, in combination, a housing, an alkaline electrolyte located in said housing and having hydrazine distributed therethrough; a fuel electrode consisting essentially of a coherent, continuous body formed of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte, said fuel electrode and said carbon electrode defining therebetween a space which is occupied substantially only by said alkaline electrolyte.

6. A fuel cell comprising, in combination, a housing; an alkaline electrolyte located in said housing and having hydrazine distributed therethrough; a fuel electrode consisting essentially of a coherent, continuous body formed of a porous sheet of at least one metal of group VIII of periodic system selected from the group consisting of iron, cobalt and nickel and being free of metals of groups II and III of the periodic system in contact with said electrolyte; and a metal-free carbon electrode spaced from said fuel electrode and in contact with said electrolyte.

7. A fuel cell comprising, in combination, a housing; an alkaline electrolyte located in said housing and having hydrazine distributed therethrough; a fuel electrode consisting essentially of a coherent, continuous body formed of pressed sintered particles of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte.

8. A fuel cell comprising, in combination, a housing; an alkaline electrolyte located in said housing and having hydrazine distributed therethrough; a fuel electrode consisting essentially of a coherent, continuous body formed of a porous sheet of at least one metal of group VIII of periodic system selected from the group consisting of iron, cobalt and metal and being free of metals of groups II and III of the periodic system in contact with said electrolyte; and a metal-free carbon electrode spaced from said fuel electrode and in contact with said electrolyte, said fuel electrode and said carbon electrode defining therebetween a space which is occupied substantially only by said alkaline electrolyte.

9. A fuel cell comprising, in combination, a housing; an alkaline electrolyte located in said housing and having hydrazine distributed therethrough; a fuel electrode consisting essentially of a coherent, continuous body formed of pressed sintered particles of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte, said fuel electrode and said carbon electrode defining therebetween a space which is occupied substantially only by said alkaline electrolyte.

10. A fuel cell comprising, in combination, a housing; an aqueous solution of an alkaline electrolyte selected from the group consisting of alkali metal hydroxides, alkaline earth hydroxides and ammonium hydroxide located in said housing and having hydrazine distributed therethrough; a fuel electrode consisting essentially of a coherent, continuous body formed of at least one metal of group VIII of the periodic system and being free of metals of groups II and III of the periodic system in contact with said electrolyte; and a metal-free carbon electrode spaced from said fuel electrode and in contact with said electrolyte.

11. A fuel cell comprising, in combination, a housing; an aqueous solution of an alkaline electrolyte selected from the group consisting of alkali metal hydroxides, alkaline earth hydroxides and ammonium hydroxide in a concentration of about 3–8 mols per liter located in said housing and having hydrazine distributed therethrough; a fuel electrode consisting essentially of a coherent, continuous body formed of at least one metal of group VIII of the periodic system and being free of metals of groups II and III of the periodic system in contact with said electrolyte; and a metal-free carbon electrode spaced from said fuel electrode and in contact with said electrolyte.

12. A fuel cell comprising, in combination, a housing; an aqueous solution of an alkaline electrolyte selected from the group consisting of alkali metal hydroxides, alkaline earth hydroxides and ammonium hydroxide in a concentration of about 3–8 mols per liter located in said housing and having hydrazine distributed therethrough; a fuel electrode consisting essentially of a coherent, continuous body formed of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte, said fuel electrode and said carbon electrode defining therebetween a space which is occupied substantially only by said alkaline electrolyte.

13. A fuel cell comprising, in combination, a housing; an aqueous solution of an alkaline electrolyte selected from the group consisting of alkali metal hydroxides, alkaline earth hydroxides and ammonium hydroxide located in said housing and having hydrazine distributed therethrough in an amount of between about 0.1 and 10 percent by weight; a fuel electrode consisting essentially of a coherent, continuous body formed of at least one metal of group VIII of the periodic system and being free of metals of groups II and III of the periodic system in contact with said electrolyte; and a metal-free carbon electrode spaced from said fuel electrode and in contact with said electrolyte.

14. A fuel cell comprising, in combination, a housing; an aqueous solution of an alkaline electrolyte selected from the group consisting of alkali metal hydroxides, alkaline earth hydroxides and ammonium hydroxide in a concentration of about 3–8 mols per liter located in said housing and having hydrazine distributed therethrough in an amount of between about 0.1 and 10 percent by weight; a fuel electrode consisting essentially of a coherent, continuous body formed of at least one metal of group VIII of the periodic system and being free of metals of groups II and III of the periodic system in contact with said electrolyte; and a metal-free carbon electrode spaced from said fuel electrode and in contact with said electrolyte.

15. A fuel cell comprising, in combination, a housing; an aqueous solution of an alkaline electrolyte selected from the group consisting of alkali metal hydroxides, alkaline earth hydroxides and ammonium hydroxide in a concentration of about 3–8 mols per liter located in said housing and having hydrazine distributed therethrough in an amount of between about 0.1 and 10 percent by weight; a fuel electrode consisting essentially of a coherent, continuous body formed of at least one metal of group VIII of the periodic system selected from the group consisting of iron, cobalt and nickel and being free of metals of groups II and III of the periodic system in contact with said electrolyte; and a metal-free carbon electrode spaced from said fuel electrode and in contact with said electrolyte.

References Cited
UNITED STATES PATENTS

| | | | |
|---|---|---|---|
| 3,050,386 | 8/1962 | Von Dohren | 75—222 X |
| 3,113,049 | 12/1963 | Worsham | 136—86 |
| 3,125,468 | 3/1964 | Thompson et al. | 136—86 |
| 3,134,697 | 5/1964 | Niedrach | 136—86 |
| 3,226,261 | 12/1965 | Forten | 136—86 |
| 3,226,263 | 12/1965 | Oswin | 75—222 X |
| 3,252,839 | 5/1966 | Langer | 136—86 |

BENJAMIN R. PADGETT, *Primary Examiner.*

A. J. STEINER, *Assistant Examiner.*